United States Patent
Ryu et al.

(10) Patent No.: US 8,057,593 B1
(45) Date of Patent: Nov. 15, 2011

(54) PIGMENT DISPERSIONS AND BLACK WATER-REDUCING AGENT FOR CEMENT

(75) Inventors: Hae Yoon Ryu, Gyeonggi-Do (KR); Kwang Eui Yoon, Seoul (KR); Sang Je Cho, Gyeonggi-Do (KR); Moo Soo Park, Seoul (KR); Yo Bok Park, Gyeongsangbuk-Do (KR); Se In Yang, Gyeonggi-do (KR)

(73) Assignee: OCI Company Ltd, Seoul (KR)

( * ) Notice: Subject to any disclaimer, the term of this patent is extended or adjusted under 35 U.S.C. 154(b) by 0 days.

(21) Appl. No.: 13/039,883

(22) Filed: Mar. 3, 2011

(30) Foreign Application Priority Data

Nov. 2, 2010 (KR) ........................ 10-2010-0108363

(51) Int. Cl.
*C09C 1/56* (2006.01)
*C09B 67/00* (2006.01)
*C09B 67/18* (2006.01)
*C04B 40/00* (2006.01)

(52) U.S. Cl. ........ 106/475; 106/472; 106/712; 106/806; 106/814; 106/823

(58) Field of Classification Search ................... 106/472, 106/475, 712, 806, 814, 823
See application file for complete search history.

(56) References Cited

U.S. PATENT DOCUMENTS

| | | | |
|---|---|---|---|
| 3,290,165 A * | 12/1966 | Iannicelli | 106/475 |
| 6,258,864 B1 * | 7/2001 | Dalton et al. | 521/82 |
| 6,586,501 B1 * | 7/2003 | Dalton et al. | 523/215 |
| 7,365,110 B2 * | 4/2008 | Kirino | 523/212 |
| 2004/0054033 A1 * | 3/2004 | Kirino | 523/215 |
| 2004/0231567 A1 | 11/2004 | Dulzer et al. | |

FOREIGN PATENT DOCUMENTS

| | | | |
|---|---|---|---|
| JP | 2000-169780 A | * | 6/2000 |
| KR | 10-0744829 B1 | | 7/2007 |
| KR | 10-0758314 B1 | | 9/2007 |

* cited by examiner

*Primary Examiner* — Anthony Green
(74) *Attorney, Agent, or Firm* — Frommer Lawrence & Haug LLP; Ronald R. Santucci

(57) ABSTRACT

The present invention relates to a pigment dispersion and a black water-reducing agent, more particularly, to a pigment dispersion comprising a carbon black whose surface is modified with an aminosilane compound and a polycarboxylic acid-based water-reducing agent, and a black water-reducing agent using the same. The present invention is characterized in that the surface-modified carbon black with an aminosilane compound is water-dispersed by using a polycarboxylic acid-based water-reducing agent as a dispersing agent having better performance than a naphthanlene-based water-reducing agent. Therefore, the present invention can display black color of the water-reducing agent and cement at the same time and improve the flowability of cement owing to the presence of carbon black in the form of nanoparticles, which enables to manufacture ultrahigh strength concrete. Further, by using the method in accordance with the present invention, it is also possible to use conventional polycarboxylic acid-based water-reducing agents as a pigment dispersing agent for carbon black.

9 Claims, No Drawings

PIGMENT DISPERSIONS AND BLACK WATER-REDUCING AGENT FOR CEMENT

This application claims priority of Korean Patent Application Number 10-2010-0108363 filed Nov. 2, 2010, the disclosure of which is incorporated herein by reference.

BACKGROUND OF THE INVENTION

1. Field of the Invention

The present invention relates to a pigment dispersion which is characterized by comprising surface-modified carbon black with an aminosilane compound and a polycarboxylic acid-based water-reducing agent, and a black water-reducing agent using the same.

2. Description of the Related Art

A water-reducing agent is a mixing agent for improving workability of concrete as a main purpose, which can reduce the amount of concrete to be used and improve strength thereof, leading to a saving in cement. The water-reducing agents for cement can be divided broadly into three groups of lignin-based, naphthalene-based and polycarboxylic acid-based water-reducing agents. They exhibit good flowability and durability in the order as listed above. The goal of such a water-reducing agent is fundamentally to improve water-reducing capability of cement.

Recently, it has been demonstrated that the use of a naphthalene-based water-reducing agent as a dispersing agent for carbon black is effective in reducing water-cement ratio. However, since the naphthalene-based water-reducing agent has a disadvantage of having lower water-reducing capability than the polycarboxylic acid-based water-reducing agent, there is a limitation to exhibit high performance.

U.S. Patent Application Publication No. 2004-0231567 discloses a method of suspending iron oxide and carbon black by using a polycarboxylic acid-based dispersing agent. However, according to this method, pigments are introduced only into certain specific dispersing agents synthesized through a complicated polymer synthesis process, and thus, there is a problem in that it is impractical.

Therefore, there is a need to develop a method for using the conventional polycarboxylic acid-based water-reducing agents as a dispersing agent for carbon black.

The present inventors have endeavored to develop a method of using the conventional polycarboxylic acid-based water-reducing agent with good performance as a pigment dispersing agent for carbon black, and therefore, found that when the surface of carbon black is modified with an aminosilane compound so as to introduce functional groups, and a pigment dispersion is manufactured by using thus obtained surface-modified carbon black together with a polycarboxylic acid-based water-reducing agent, it is possible to manufacture ultra-high-strength concrete with good dispersability and displaying black color of the water-reducing agent and cement at the same time.

SUMMARY OF THE INVENTION

The present invention is conceived to solve the aforementioned problems in the prior art. An object of the present invention is to provide a pigment dispersion having excellent dispersability and strength.

Another object of the present invention is to provide a black water-reducing agent for cement having excellent dispersion stability and flowability with displaying black color by using the pigment dispersion of the present invention.

According to an aspect of the present invention for achieving the objects, there is provided a pigment dispersion comprising carbon black whose surface is modified with an aminosilane compound as a pigment, and a polycarboxylic acid-based water-reducing agent as a pigment dispersing agent.

According to another aspect of the present invention, there is provided a black water-reducing agent for cement comprising the pigment dispersion of the present invention.

DESCRIPTION OF THE PREFERRED EMBODIMENT

The pigment dispersion of the present invention is characterized by comprising a carbon black whose surface is modified with an aminosilane compound as a pigment, and a polycarboxylic acid-based water-reducing agent as a pigment dispersing agent.

Hereinafter, the present invention will be described in detail.

The term "surface-modified carbon black with an aminosilane compound" as used herein refers to carbon black whose surface functional groups are regulated such that it is highly dispersed in a polycarboxylic acid-based water-reducing agent. The present invention uses an aminosilane compound as a surface modifying agent for carbon black. Since an amine functional group can be easily attached to the surface of carbon black and amplified thereon, there is an advantage in that it is possible to introduce the functional groups as many as it want. In an aqueous solution, while a silane group converts into a silanol group, an amine functional group remains unchanged, thus resulting in the formation of aminosilica carbon black.

According to the present invention, it is possible to regulate the amount of the amine functional groups being attached to the surface of carbon black by controlling the amount of the aminosilane compound to be used. For efficient representation of surface properties, the aminosilane compound is preferably used in the amount of 0.1 to 50 parts by weight based on 100 parts by weight of carbon black. It is more preferable to use it in the amount of 0.2 to 30 parts by weight. When the amount of aminosilane compound exceeds the above range, the amount of unreacted aminosilane compounds is increased, leading to the deterioration of economical efficiency. There is no limitation to the kinds of aminosilane compounds suitable for the present invention, but it is preferable to use an aminosilane compound having one or more of alkoxy functional groups, more preferably, three or more of alkoxy functional groups. In such aminosilane compounds, a condensation reaction between them well occurs. Examples of the aminosilane compound suitable for the present invention may include 3-aminopropyltrialkoxysilane, N-aminoethyl-3-propyltrialkoxysilane, N-alkyl-3-aminopropyltrialkoxysilane, and the like.

In terms of dispersability, it is preferable to use carbon black containing 0.1 to 30%, more preferably, 1 to 20% of functional groups, based on the amine functional group. If the amine functional group introduced into the surface of carbon black is below 0.1%, their effect on the dispersability of carbon black is insignificant. On the contrary, if it exceeds 30%, it is not advantageous in that a big lump of carbon particles is generated due to excessive cross-linking thus incurring a cost burden.

The surface-modified carbon black with the aminosilane compound can be prepared according to the methods as described in Korean Patent Nos. 758314 and 744829. For example, carbon black is mixed with the aminosilane compound in an organic solvent such as alcohol, and then, the resulting mixture is subjected to surface modification reaction by removing the solvent therefrom. During the reaction, while a silane group of the aminosilane compound converts into a silanol group, an amine functional group thereof remains unchanged, resulting in the formation of aminosilica carbon black.

Preferably, it is possible to add the compound represented by the following Formula 1 to the surface modifying agent so as to increase the content of silica. Such an increase in the content of silica results from the cross-linking between the aminosilane compound and $Si(OR)_4$.

   [Formula 1]

wherein R is methyl or ethyl.

The compound of Formula 1 can be added to the surface modifying agent in the amount of 0.1 to 50 parts by weight, preferably 0.2 to 30 parts by weight, based on 100 parts by weight of carbon black.

As the amount of $Si(OR)_4$ increases, the content of silica increases as well. Considering that the cross-linking between the aminosilane compound and $Si(OR)_4$ cannot occur without amine, the amount of $Si(OR)_4$ should be properly regulated along with the aminosilane compound. Further, in order to occur the cross-linking without the amine functional group, there is a disadvantage of requiring the use of another catalyst such as an acid or a base. Preferably, the aminosilane compound and $Si(OR)_4$ are used in the molecular ratio in the range of from 1~99.99 wt %:99~0.01 wt %.

The pigment dispersing agents suitable for the present invention include polycarboxylic acid-based water-reducing agents. Because of their high performance, the polycarboxylic acid-based water-reducing agents are indispensable to the manufacture of ultrahigh strength concrete. Further, in the case of adding nanoparticle materials to a cement composition, they act like a nano-bearing balls which enable to further improve flowability. For this, the surface-modified carbon black with the aminosilane compound according to the present invention is subjected to nanoparticle formation by using a high performance polycarboxylic acid-based water-reducing agent as a pigment dispersing agent. There is no limitation to the kinds of polycarboxylic acid-based water-reducing agents so long as they are well-known to a person skilled in the art. For example, it is possible to use a polycarboxylic acid-based water-reducing agent which is prepared by esterification of polyacrylic polymers and poly(ethylene glycol) and has a comb-like structure. It is preferable to use the polycarboxylic acid-based water-reducing agent in the amount of 0 to 100 parts by weight based on 100 parts by weight of the surface-modified carbon black with the aminosilane compound. If the amount thereof is lower than 10 parts by weight, there is a problem of dispersability. Meanwhile, if it exceeds 100 parts by weight, it becomes uneconomical.

The pigment dispersion of the present invention can be prepared by milling the pigment with the pigment dispersing agent. Generally, as the amount of absorbing oil of carbon black to dibutyl phthalate (DBP) increases, it requires a larger amount of the dispersing agent. Preferably, the surface-modified carbon black according to the present invention shows the amount of absorbing oil to DBP in the range of 20 to 200 ml/100 g. In addition, it is preferable that the carbon black of the present invention has a surface area ranging from 5 to 500 $m^2/g$.

The content of the surface-modified carbon black is preferably in the rage from 0.1 to 40 wt %, more preferably 5 to 20 wt %, based on the total amount of the pigment dispersion, which results in high dispersability. If the surface-treated carbon black with the aminosilane compound is used less than 0.1 wt %, the number of particles becomes too small. If the amount exceeds 40 wt %, it results in poor dispersability.

In the case of using the polycarboxylic acid-based water-reducing agent as a pigment dispersing agent, conventional carbon black does not dispersed therein due to the lack of reaction binding affinity. To solve this problem, the present invention is characterized by using the surface-modified carbon black together with the polycarboxylic acid-based water-reducing agent. The surface modification of carbon black is important factor so as to use the polycarboxylic acid-based water-reducing agent as a pigment dispersing agent for carbon black. The polycarboxylic acid-based water-reducing agent includes carboxyl functional groups, some of which are composed of comb-like shaped polymers. In accordance with the present invention, the functional groups of the polycarboxylic acid-based water-reducing agent spontaneously react with amine functional groups of carbon black via acid-base reaction. Thus, when amine functional groups are introduced into the surface of carbon black, it is possible to use various kinds of polycarboxylic acid-based water-reducing agents as a pigment dispersing agent for carbon black.

As described above, the present invention can display black color of cement by modifying the surface of carbon black with an aminosilane compound so as to regulate the amount of functional groups, followed by reacting with the polycarboxylic acid-based water-reducing agent. Further, owing to the presence of carbon black in the form of nanoparticles, flowability of cement can be further improved, which enables to manufacture concrete with ultrahigh strength.

In addition, the present invention can prepare a black water-reducing agent with excellent flowability for cement by adding the pigment dispersion of the present invention to cement. Here, the amount of the pigment dispersion added is in the range of 0.1 to 20 wt %. If the amount of the black water-reducing agent is lower than 0.1 wt %, its water reducing capability may be reduced and its darkness may not be sufficient. If the amount exceeds 20 wt %, its water reducing capability and darkness may be improved, but it is not favorable in terms of cost.

According to the present invention so constructed, the following advantages can be expected.

The present invention is characterized in that the surface-modified carbon black with an aminosilane compound is water-dispersed by using a polycarboxylic acid-based water-reducing agent as a dispersing agent having better performance than a naphthanlene-based water-reducing agent. Therefore, the present invention can display black color of the water-reducing agent and cement at the same time and improve the flowability of cement owing to the presence of carbon black in the form of nanoparticles, which enables to manufacture ultrahigh strength concrete. Further, the method of the present invention enables to use conventional polycarboxylic acid-based water-reducing agents as a pigment dispersing agent for carbon black.

A better understanding of the present invention may be obtained through the following examples which are set forth to illustrate, but are not to be construed as limiting the present invention.

Example 1

Preparation of Pigment Dispersion

The introduction of aminosilica into carbon black (OCI, N220) was carried out according to the method as described in Korean Patent No. 758,314. To 20 parts by weight of thus prepared carbon black into which 5% of amine functional groups are introduced was added 10 parts by weight of a polycarboxylic acid-based water-reducing agent (Tong Yang Major, HRA 700, solid content: 40%) and 70 parts by weight of water. The resulting mixture was then poured into an inline mixer (K&S), and the mixer was operated at 3000 rpm for 1 hour, to thereby obtain a pigment dispersion.

Example 2

Preparation of Pigment Dispersion

The introduction of aminosilica into carbon black (OCI, N220) was carried out according to the method as described in Korean Patent No. 758,314. To 20 parts by weight of thus prepared carbon black, wherein 5% of amine functional groups were introduced, was added 10 parts by weight of a polycarboxylic acid-based water-reducing agent (Tong Yang Major, WR 700, solid content: 40%) and 70 parts by weight of water. The resulting mixture was then poured into an inline mixer (K&S), and the mixer was operated at 3000 rpm for 1 hour, to thereby obtain a pigment dispersion.

Example 3~5

Preparation of Pigment Dispersion

The pigment dispersions were prepared according the same method as described in Example 1 except that commercially available polycarboxylic acid-based water-reducing agents (solid content: 40%) as shown in the following Table 1 were used.

TABLE 1

| Example | Water-reducing agent | Average particle size (nm) |
| --- | --- | --- |
| 3 | SRA750 | 180 |
| 4 | DYS1000 | 190 |
| 5 | RX-1 | 220 |

The water-reducing agents described in Table 1 belong to conventional polycarboxylic acid-based water-reducing agents and were purchased from Tong Yang Major. It has been found that the pigment dispersions prepared in Examples 1 to 5 show high dispersability after one week of storage at room temperature.

Comparative Example 1

Preparation of Pigment Dispersion

The pigment dispersion was prepared according to the same method as described in Example 1 except that unmodified carbon black (N220) was used.

Test Example 1

Average Particle Size and Analyses of Particle Size in Pigment Dispersion

In order to compare the pigment dispersions prepared in Examples 1 to 5 with that prepared in Comparative Example 1, their average particle size and particle size after one week of storage at room temperature were measured, and the results are shown in Table 2. The average particle size of each pigment dispersion was measured by using a grind gauge (Otsuka Electronics Korea, ELS-Z). The dispersability level was observed by measuring the particle size thereof after one week of storage with the grind gauge.

TABLE 2

| | Dispersability | Average particle size (nm) | Particle size after one week of storage |
| --- | --- | --- | --- |
| Example 1 | Good | 180 | No change |
| Example 2 | Good | 185 | No change |
| Example 3 | Good | 180 | No change |
| Example 4 | Good | 190 | No change |
| Example 5 | Normal | 220 | 320 |
| Comparative Example 1 | Poor | 400 | Generation of aggregates in large quantity |

As can be seen in the above results, it was found that the pigment dispersions prepared in Examples 1 to 4 showed good dispersability and had an average particle size of 180 nm. Further, it was also confirmed that there was no change in particle size after one week of storage at room temperature. The pigment dispersion of Example 5 showed relatively lower physical properties than those of Examples 1 to 4, but they were regarded as good. On the other hand, in the case of the pigment dispersion prepared in Comparative Example 1, its dispersability was not good. Its average particle size was 400 nm, and a large quantity of aggregates was generated after one week of storage at room temperature, which makes it difficult to mix with cement.

Test Example 2

Preparation of Black Water-Reducing Agent and Flowability Measurement

The performance of cement is generally assessed by measuring a particle size (nm) and an average length of being spread by means of a slump measuring instrument. In order to measure the slump of the pigment dispersion prepared in Example 1, a black water-reducing agent for cement was prepared by mixing 100 g of cement (Tong Yang Cement), 2.5 g of the pigment dispersion prepared in Example 1 and 43 g of water and stirring the mixture for 3 minutes, followed by measuring its slump by using a slump measuring instrument with a capacity of 100 ml. Here, the measurement of concrete slump is to assess the flowability of cement. As a result of measuring the average length (mm) of the black water-reducing agent being spread and the slump of each cement sample after 3 days of solidification, their average length was 155 mm. To compare this result, when used only a polycarboxylic acid water-reducing agent, the resulting water-reducing agent showed 150 mm of the average length. These results suggest that the addition of carbon black exhibits somewhat better physical properties than the absence thereof. Further, as a result of measuring the slump loss over time, the black water-reducing agent of the present invention showed good physical properties equal to or higher than that of Comparative Example, which suggests that although carbon black is added, there is no decrease in workability of a water-reducing agent.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

What is claimed is:

1. A pigment dispersion comprising carbon black, whose surface is modified with an aminosilane compound as a surface modifying agent, and a polycarboxylic acid-based water-reducing agent.

2. The pigment dispersion of claim 1, which further comprises a compound represented by the following Formula 1, in addition to the surface modifying agent:

 [Formula 1]

wherein R is methyl or ethyl.

3. The pigment dispersion of claim 1, wherein the carbon black whose surface is modified with an aminosilane compound includes an amine functional group introduced at the surface thereof in the range of 0.1 to 30%.

4. The pigment dispersion of claim 2, wherein the aminosilane compound and compound of Formula 1 are used in the ratio ranging from 1~99.99 wt %:99~0.01 wt % of aminosilane compound:compound of Formula 1.

5. The pigment dispersion of claim 1, wherein the polycarboxylic acid-based water-reducing agent is used in the amount ranging from 10 to 100 parts by weight based on 100 parts by weight of carbon black whose surface is modified with an aminosilane compound.

6. The pigment dispersion of claim 1, wherein the content of carbon black whose surface is modified with an aminosilane compound is in the range of 0.1 to 40 wt % based on the total amount of the pigment dispersion.

7. The pigment dispersion of claim 1, wherein the aminosilane compound is 3-aminopropyltrialkoxysilane, N-aminoethyl-3-propyltrialkoxysilane or N-alkyl-3-aminopropyltrialkoxysilane.

8. A black water-reducing agent for cement comprising the pigment dispersion according to claim 1.

9. The black water-reducing agent of claim 8, wherein the content of the pigment dispersion is in the range of 0.1 to 20 wt %.

* * * * *